UNITED STATES PATENT OFFICE.

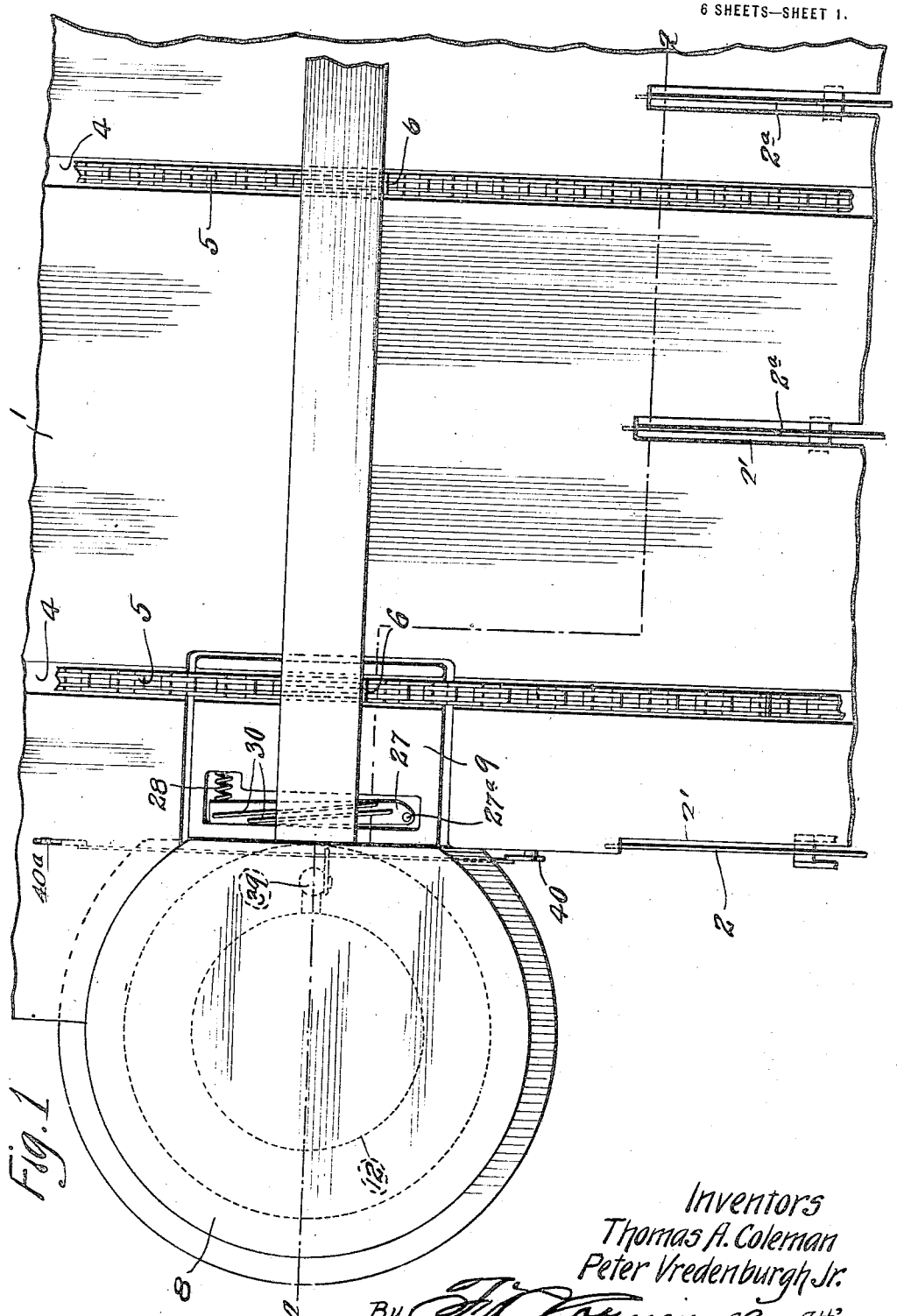

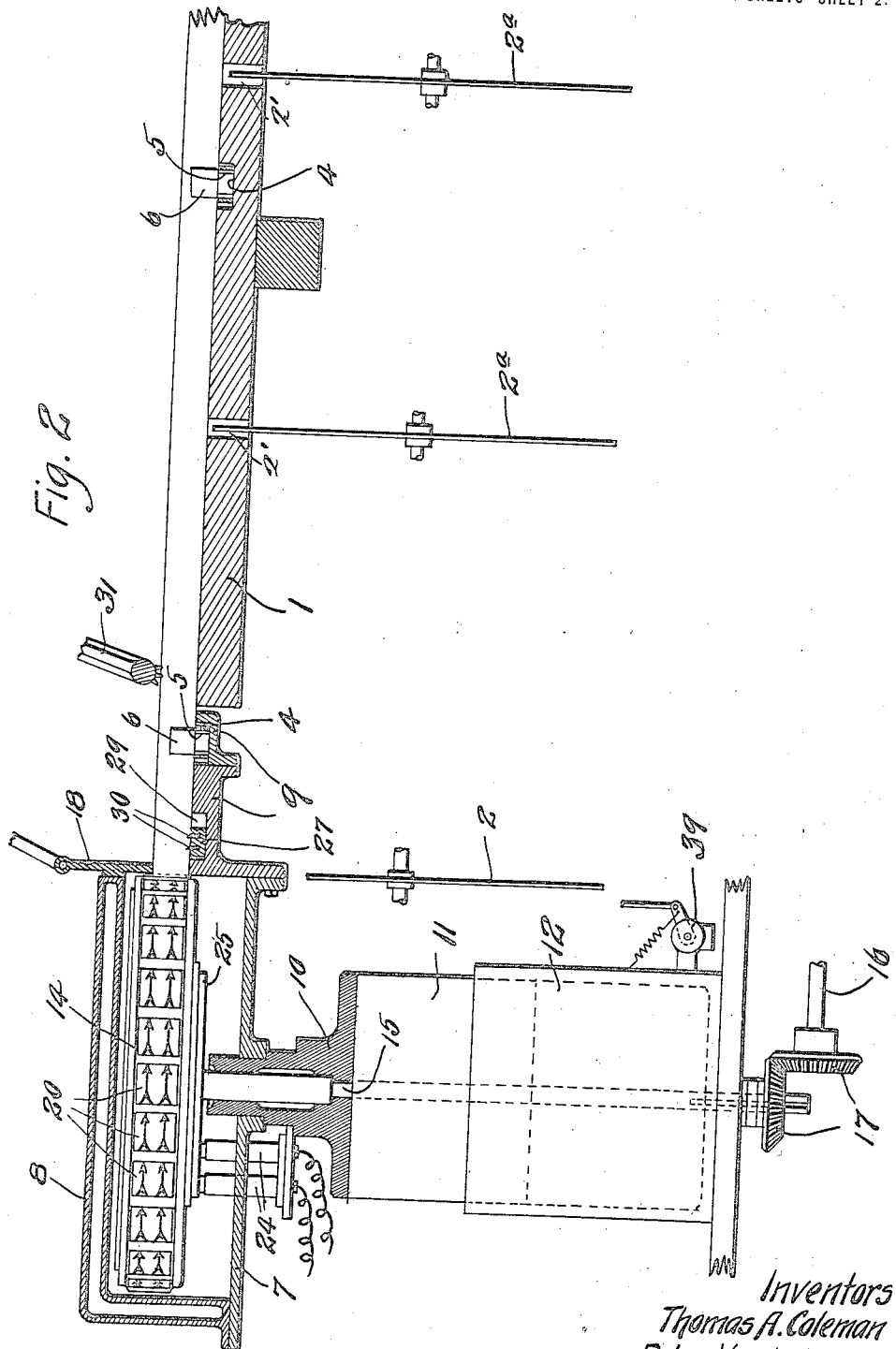

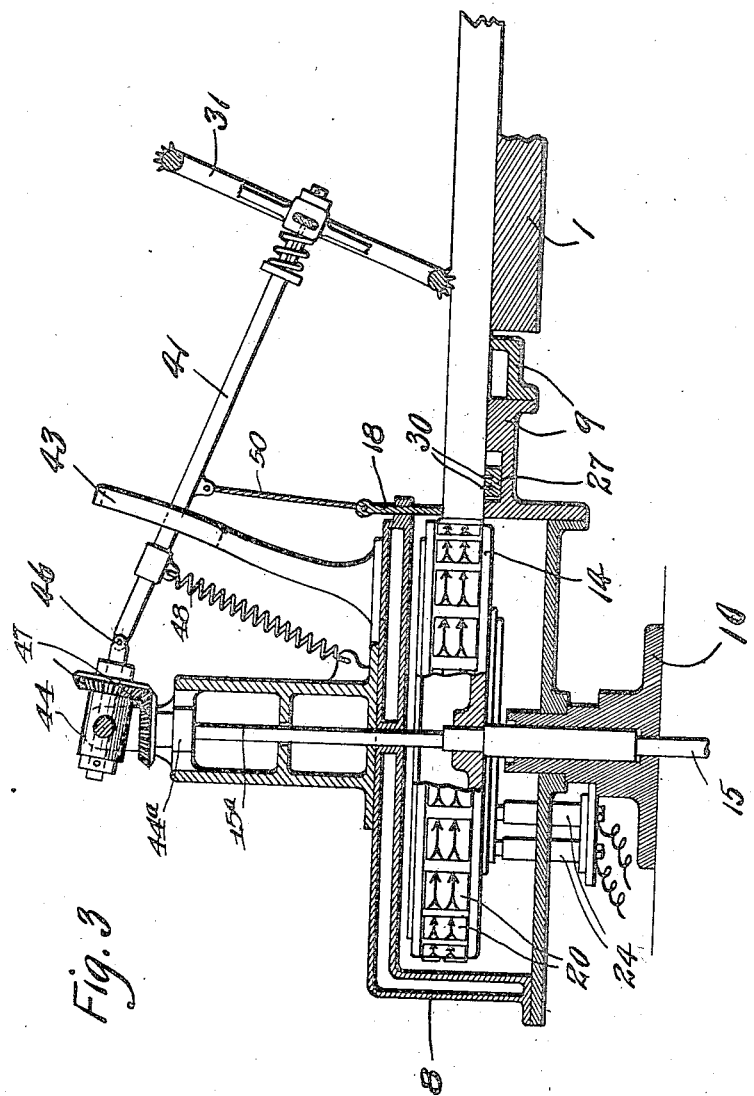

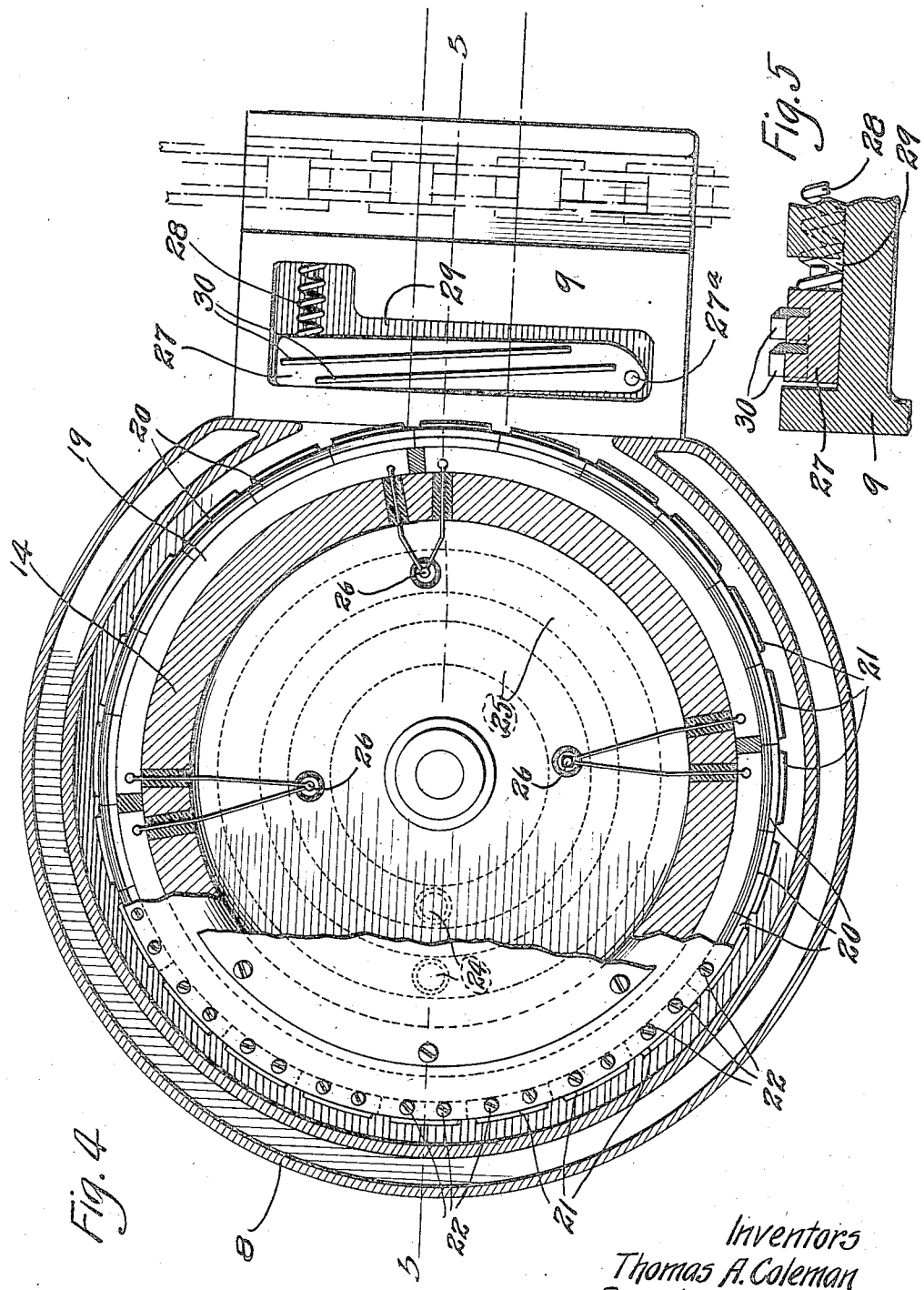

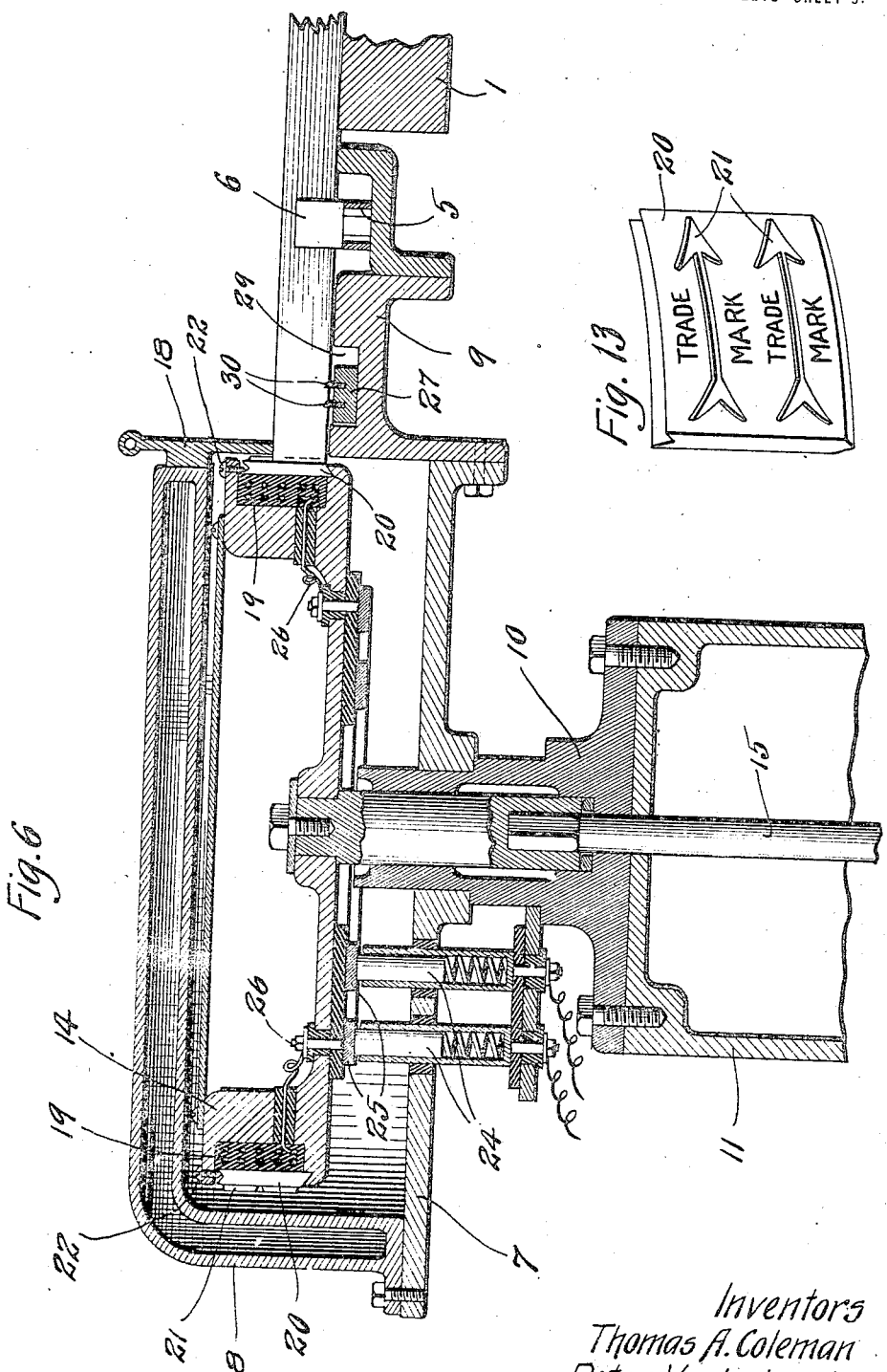

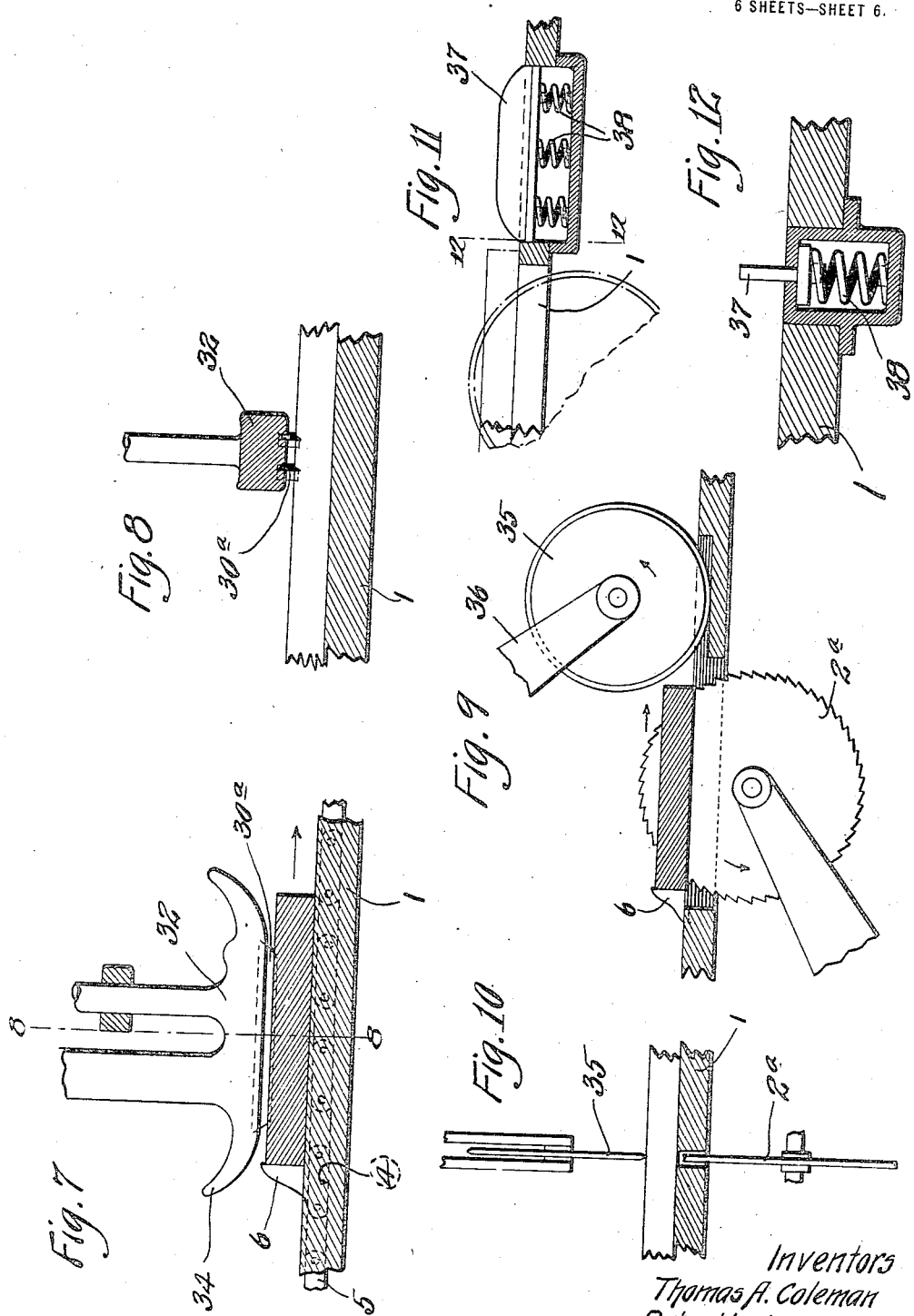

THOMAS A. COLEMAN AND PETER VREDENBURGH, JR., OF VREDENBURGH, ALABAMA, ASSIGNORS, BY DIRECT AND MESNE ASSIGNMENTS, TO JOSEPH G. McDONOUGH, OF EAU CLAIRE, WISCONSIN.

MARKING-MACHINE.

1,287,887.

Specification of Letters Patent. Patented Dec. 17, 1918.

Application filed December 18, 1915. Serial No. 67,550.

*To all whom it may concern:*

Be it known that we, THOMAS A. COLEMAN and PETER VREDENBURGH, Jr., citizens of the United States, residing at the town of Vredenburgh, county of Monroe, and State of Alabama, have invented a certain new and useful Improvement in Marking-Machines, of which the following is a full, clear, and exact description, such as will enable others skilled in the art to which it appertains to make and use the same, reference being had to the accompanying drawings, forming part of this specification.

This invention relates to a machine for mechanically marking the ends or edges of lumber or similar material.

The principal object of the invention is to provide a device whereby lumber may be marked, as with a grade mark or a trade mark, during the course of its manufacture, and without necessitating its being rehandled especially for the marking operation.

Another object of the invention is to provide a machine for marking lumber or similar material, which is in effect automatic in that it requires no special operator, its function being exercised in conjunction with the operation of other machines employed in the manufacture of the lumber.

Another object of our invention is to provide a device for marking lumber which may be used in conjunction with the machine commonly known as a trimmer.

A further object is to provide a marking machine which is adapted for use with trimmers already installed or in operation.

A still further object is to provide a marking machine of the sort specified which has a large output capacity.

Another object is to provide a marking machine by which a mark may be either printed, pressed or burned upon the lumber as may be desired.

A still further object is to provide a marking machine of the sort specified which may be rendered inoperative for a desired period upon the omission of a selected prior operation or step in the manufacture of the lumber.

A further object of our invention is to provide special operating devices of novel form and operation for performing the various coöperating functions which result in the proper marking of the lumber.

Other and further objects of our invention will be obvious or pointed out hereinafter.

There is a growing demand in the lumber manufacturing trade for a successful and efficient device for marking lumber during its course of manufacture with any desired trade mark or grade mark. Various devices heretofore attempted have not proved acceptable to lumber manufacturers either from cost of operation, due to their requiring special handling of the lumber, inaccuracy in operation, or slowness.

A machine which will successfully mark the ends of boards has a greater utility than one which is designed to operate upon only the sides or edges of boards, for the reason that before use, in most cases, the sides and edges of boards are dressed, which would remove a mark placed on those parts, and furthermore, the sides and edges must be kept smooth and unmarred in order to maintain the grade of the lumber.

The device constituting our present invention is designed to meet all of these various requirements for a successful marking machine, and to secure the desired result in an economical and efficient manner.

In the accompanying drawings, we have shown for the purpose of illustration, various forms of our invention, including divers forms and modifications of various parts thereof.

In said drawings—

Figure 1 represents a partial plan or top view of a trimmer equipped with our invention, parts being broken away;

Fig. 2 represents a vertical elevation partly in section substantially on line 2—2 of Fig. 1;

Fig. 3 is a similar vertical section but of a form modified in various particulars;

Fig. 4 is a top view partly in section of the marking device apart from the trimmer;

Fig. 5 is a sectional detail taken substantially on line 5—5 of Fig. 4;

Fig. 6 is a vertical section substantially on line 6—6 of Fig. 4;

Fig. 7 is a side elevation of a modified form of device for holding the lumber to the operation of the marking device;

Fig. 8 is a vertical section of the same substantially on line 8—8 of Fig. 7;

Fig. 9 is a side elevation of a second modified form of holding device.

Fig. 10 is an end or front view of the same.

Fig. 11 is a detail illustrating a third modified form of the holding device, showing a side elevation of same.

Fig. 12 is a vertical section of said third modified form, same being taken substantially on line 12—12 of Fig. 11.

Fig. 13 is a perspective view of a die plate.

Referring to the drawings, it will be understood that 1 represents generally the table or deck of a machine commonly called a trimmer, which is used in the manufacture of lumber. The nature of this machine is well known to those skilled in the art, and it need not be described more in detail here except to state that its purpose is to trim the ends of boards whereby to produce boards of various standard lengths. The machine employs a plurality of saws 2 and 2ª which are independently movable vertically relative to the table, the terminal saw 2 being commonly known as the head saw, and the other saws 2ª being spaced apart different distances from the head saw in order to trim boards of different lengths.

In suitable channel ways 4 travel conveyer chains 5 which carry flights 6 which engage the sides of the boards to feed them forward to the action of the saws. The head saw and the selected one of the other saws trim off the ends of the boards, making them of uniform length in any of the various lengths such as 8, 10, 12, 14, 16, and so on. In the form illustrated, the saws are carried below the table and operate through slots 2'. In other forms, however, they are carried on suitable frames upon the table and are movable downwardly into coöperation with boards upon the table. My invention is adapted for use with either form of trimmer.

The marking device includes a base plate 7 upon which is carried a double casing 8, and laterally extending shelf members 9. A sleeve 10 carried upon piston 11 provides a support for the base plate 7, and the piston 11 is operably supported within a cylinder 12. Within the housing formed by the base plate 7 and casing 8 is the marking wheel 14 which is carried on a shaft 15 suitably journaled in the sleeve 10. Wheel 14 and shaft 15 are driven from transmission shaft 16 through intermeshing pinions 17, one of which is slidably keyed on shaft 15 so as to permit vertical movement of shaft 15 therethrough. This device is positioned at one end of the trimmer, the table of which is suitably cut to accommodate a part of the casing 8, and also the shelf members 9. The latter lie in the general plane of the table, forming in effect a part thereof for the purpose hereinafter described. The device is positioned behind the head saw 2, and with the periphery of the wheel 14 tangent to the plane of the head saw. In other words the relationship of the wheel 14 to the head saw 2 is such that the end of a board which has been trimmed by the head saw will be brought into contact with the periphery of the wheel 14 as the board is moved rearwardly by the conveyers.

The detail construction of the marking device will best be understood by reference to Figs. 4 and 6. From these it will be seen that casing 8 is substantially cylindrical in shape, the space between the double walls thereof being utilized for heat insulation as hereinafter explained. The front of the casing, that is the portion which is directed toward the trimmer table and which lies behind the head saw, is open sufficient to permit the periphery of the wheel 14 to project slightly therefrom. This front aperture of the casing is adapted to be closed by the slide 18. The marking wheel, as will best be seen in Fig. 6, is grooved annularly about its circumference, and within the annular groove are seated electrical heating elements 19. These may be of any desired suitable construction which will be effective to generate a high degree of heat, and therefore should consist of electrical resistance elements embedded or incased in refractory insulating material. There are preferably a number of these heating elements to facilitate manufacture and replacement, their exact form, of course, depending upon the form of the peripheral groove of the marking wheel, which, of course, may be varied. If desired, the seats for the heating elements may be lined with asbestos or other heat insulating material to deter conduction of heat from the elements to the wheel. Peripherally mounted on the wheel are die plates 20 provided with suitable marking elements 21. These die plates are preferably of steel, and are associated with the heating elements 19 in such manner as to accomplish the greatest possible conduction of heat to them from the latter. There may be any desired number of these die plates, and they are preferably disposed about the entire periphery of the marking wheel. One fashion of securing them in place as seen in Fig. 6, consists in providing the bottom flange of wheel 14 upon which the die plates rest, with notches, in which the lower edges of the die plates fit, and from which their removal is prevented by set screws 22 extending through the upper flange of the wheel and engaging suitable apertures in the upper edges of the die plates. Thus the plates are secured in such fashion as to be readily removable so that they may be easily replaced and access to the heating elements facilitated. The heating elements are supplied with current from the brushes 24, which are suitably supported and which bear against the contact rings 25 carried on wheel 14.

Suitable connections 26 complete the circuit between the resistance elements in the heating elements 19 and the contact rings 25. The construction and operation is such that the die plates will be heated to a high temperature by the heating elements.

From the description of the device thus far, it will be understood that in operation, as the boards are fed forward by the conveyers, they are trimmed by the selected saws, including the head saw, after which their ends trimmed by the head saw are brought into contact with the heated die plates on the revolving wheel 14, and the die plates during the passage of the boards while in contact with them, burn the brand or mark formed by the marking elements 21 into their ends.

In order to insure the mark being clearly impressed upon the ends of the boards, it is advisable to provide some form of a holding device, which will hold the boards securely to the operation of the marking wheel. In Figs. 4 and 6, we show one form of such a holding device. This device includes a narrow plate 27 pivoted at 27$^a$, which is at its end nearest the head saw, to one of the shelf members 9 in front of the aperture of casing 8. A stiff spring 28 coöperates with the other end of plate 27 to press it firmly toward the periphery of the marking wheel, the movement of the plate being limited by a shoulder of slot 29 in shelf member 9, in which the plate 27 is mounted. Carried in plate 27 and extending diagonally from its pivoted end toward its free end and slanting in the direction of the wheel 14 are holding blades 30. These blades extend above the surface of table 1 and above the surface of shelf members 9, and have their upper edges beveled to a sharp edge. Above the table 1 is yieldably mounted a pressure wheel 31 which is designed to engage the top faces of boards as they are fed past the marking wheel, so as to press them firmly against the table and against the edges of blades 30. As the boards thus engaged by wheel 31 and blades 30 are fed rearwardly by the conveyers, they are cammed toward the marking wheel, due to the slope of blades 30 in that direction and due to the bite of the blades in the boards which prevents movement of the boards transversely across the blades. Spring 28 provides a safety release whereby excessive pressure against the die plates is prevented, as said spring will permit plate 27 to swing away from the marking wheel when the compression between the board and the wheel is sufficient to overcome the strength of the spring.

Another form of holding device is that illustrated in Figs. 7 and 8. In this form, instead of being carried in a plate fixed to the platform, the knives, corresponding to the blades 30 of the form above described, and designated 30$^a$ in Figs. 7 and 8, are carried in a weighted shoe 32 which is yieldably supported above the table. The boards, as they are fed forward by the conveyers, pass under sloping guards 34 on the weighted shoe, raising it until the blades traverse the top face of the boards. These blades bite into the material, causing it to move slightly toward the marking wheel so as to secure a proper contact. Suitable yielding pressure means may be provided to admit of a slight lateral movement of the shoe 32 when the compression between the lumber and the marking wheel becomes too great.

A third form of holding device is illustrated in Figs. 9 and 10. In this form a holding disk or wheel 35 is disposed immediately behind each of the saws 2$^a$, and in line with the printing point of the marking wheel. These disks are swingingly supported each on its own frame 36, and these disks are adapted to travel in the kerf cut by the saw at the end of the board farthest from the marking device. In such position, the disk will prevent endwise movement of the board away from the marking wheel. The pivotal frames 36 will permit disks intermediate the ends of the board riding over the board as illustrated in Fig. 10.

In Figs. 11 and 12 is illustrated a fourth form of holding device which is somewhat similar in operation to that illustrated in Figs. 9 and 10. In this form, holding plates 37 are disposed behind and in line with each of the saws 2$^a$, the plates being seated in the table and held up by pressure of springs 38. As the boards leave the saw they engage its end and hold it against movement away from the marking wheel. The forward edges of the plates 37 are inclined so that plates intermediate the ends of the boards will be cammed down out of way by the weight of the board. Of course, these plates may be set straight, or they may be given a slight inclination toward the marking wheel in order to press the boards in that direction.

In order to protect the marking wheel and its associated parts from injury from boards whose ends may not be cut off by the head saw, we provide the form of mounting illustrated in Fig. 2 wherein the device is automatically adjustable vertically into and out of the path of the boards. In this form the piston 11 which carries the marking device as well as the shelf members 9, is vertically adjustable in the cylinder 12 to such an extent that when in a lowered position the top of the casing 8 is flush with or below the upper surface of the table, so that boards with ends extending beyond the line of the head saw can pass freely over it. There are a number of ways in which a device may be constructed in order to have it automatically assume this lowered position whenever a board which is too long to permit its end making proper contact with the periphery of the marking wheel approaches the latter. In that illustrated in Fig. 2, the piston 11 and its carried parts are maintained in the elevated or operative position by means of a constant fluid pressure maintained in the cylinder 12. This may be by air or steam admitted through a three-way valve 39 which normally stands in position to maintain the cylinder in communication with the supply. This valve is controlled by a suitable spring and lever mechanism, the spring tending to hold the valve yieldingly in its normal position. A lever 40 by which this valve may be opened so as to cut off the cylinder from the fluid pressure supply, and open an exhaust port from the cylinder, extends so that its upper end is just behind the head saw and in front of the marking wheel. The position of this lever above the table is just beyond or outside of the line of the head saw, in such a position as to be engaged by the end of a board which had not been trimmed by the head saw, or in the path of a board approaching the casing 6 in such position that it would strike the side of the casing. A board which would be carried against the casing in this position would be likely to cause injury to the machine, as the casing or the marking wheel would block it while the conveyers would tend to carry it forward. Before reaching the casing, however, the extending or superfluous end of the board would trip the lever 40, cutting off the supply of pressure fluid from the cylinder 12, and permitting the fluid already in the cylinder to escape, thus removing the support from piston 11 and permitting it, together with its carried parts, to lower to a point where it will not offer obstruction to the board. Immediately the board has released the lever 40, the valve 39 will return to normal position under spring pressure, closing the exhaust and admitting pressure fluid to the cylinder, which will operate immediately to raise the marking wheel to operative position so that it may mark the next succeeding board. As an alternative form of control, the valve may be controlled by two levers, the one which opens the exhaust and cuts off the supply from the cylinder being located in the position indicated by the lever 40, and a second lever, whose function is to close the exhaust and open the supply, being located to the rear of the marking device as at 40ª so that an untrimmed board will operate first one lever to lower the device, and then after having passed the marking device, operate the second lever to raise it into operative position for the next board.

The form illustrated in Fig. 3 is not designed for this lowering and raising operation. This form, however, illustrates one arrangement of the pressure wheel 31. Here wheel 31 is slidably keyed onto a shaft 41, being movable thereon toward the marking wheel against the pressure of a spring 42. Shaft 41 is journaled in a bearing 44. Shaft 15ª, which is an upward continuation of shaft 15, is journaled in bearing 44ª, and transmission pinions 47 transmit movement from shaft 15ª to shaft 41, by which means pressure wheel 31 is rotated. Shaft 41 is provided with a universal joint 46 in order to permit the raising and lowering movement of the pressure wheel, a guide 48 coöperating with the swinging portion of shaft 41 to hold said shaft against lateral movement while permitting vertical movement thereof. The revoluble or rocking movement of bearing 44 permits shaft 41 and wheel 31 to rise and fall to accommodate the boards and to maintain a pressure upon them. If need be, a spring 49 may be utilized to secure the proper pressure upon the boards from wheel 31. The slide 18 which closes the open side of casing 6 may be operated from shaft 41, as by the flexible connection 50. As the wheel 31 and shaft 41 are raised by a board, due to the interconnection of parts, the slide 49 will be raised so as to expose the periphery of the marking wheel at the marking point. When, however, there is no board below wheel 31, slide 18 will be in its lowered position, wherein it closes casing 6, effectively preventing the ingress into the casing of foreign matter, such as sawdust, and protecting the device and associated parts from possible ignition from the heat of the die plates.

It is obvious that the pressure wheel 31 may be supported in numerous other suitable fashions, and of course where the marking device is arranged for the vertical movement above described, it may be desirable to have the pressure wheel mounted independently thereof, as on a swinging frame of the type commonly employed in trimmers having suspended saws.

Although we have shown means for positively rotating both the marking wheel and the pressure wheel, such is not essential as both of these wheels may be freely journaled so that they will receive their rotary movement from the boards as the latter while in contact with them are being carried rearwardly by the conveyers.

The form of marking wheel shown and described of course contemplates the burning of the mark into the ends of the boards. Our invention, however, is not limited to a device for accomplishing the marking in this specific fashion, as the die plates may be used as printing plates and supplied by any suitable mechanism with marking ink, so that they operate to print the mark upon the ends of the boards instead of burning it thereon. Or the die plates may have the marking elements sharp so that without being heated they will press the mark into the boards by the compression between the latter and the marking wheel, thus impressing the mark in the wood without charring it. In all instances it is desirable to have the marking elements disposed frequently and continuously around the periphery of the marking wheel so that one or more of them will be presented in the proper operative position, no matter what the rotary position of the marking wheel.

From the foregoing, it will be observed that our invention contemplates a form of device which may be operated in conjunction with the operation of a machine universally employed in the manufacture of lumber, and that, therefore, the use of our device does not necessitate special handling of the material or any special manual operation to secure the intended results. Furthermore, it is obvious that the speed of operation of the device is limited only by the speed at which the material can be fed to it. Due to the provision of means for positively and firmly holding the material to the action of the marking wheel, and due to the arrangement whereby the marking device may be withdrawn from the path of material to which it might offer obstruction, the operation of the device is certain, accurate, safe and economical. Furthermore, due to the fact that the marking device is complete in itself, and may be installed as a unit to operate in conjunction with the trimmer, it will not require special auxiliary equipment and hence it will be economical to install.

We are aware that the device herein illustrated and described and the various component parts thereof, are susceptible of changes, modifications and variations not referred to herein specifically, but within the spirit and scope of our invention as indicated in the following claims.

What we claim is:

1. A lumber marking machine comprising a movable marking device, means for feeding boards past said device, and means operating intermediate the extremities of the boards for pressing the ends of such boards into contact with the device.

2. A lumber marking machine comprising the combination of a movable marking device, means for feeding boards past said device, and yieldable means for pressing the end edges of such boards into contact with the marking device.

3. A lumber marking device comprising the combination of a wheel having peripheral marking elements, means for feeding boards past said wheel, and means operable on boards intermediate their extremities for pressing said boards toward the wheel to bring their terminal edges into contact with said marking elements while passing said wheel.

4. In a lumber marking machine, the combination of means for feeding boards, marking means adapted to mark boards so fed, said marking means being movable into and out of the plane traversed by the boards, a mechanism operable upon said marking means to move it in such fashion, and means operable by boards in the feeding operation for controlling the operation of said mechanism.

5. In a machine of the class described, the combination of means for feeding boards, a marking device including marking elements movable in the direction of a movement of the boards, a mechanism for moving said marking device across the plane of movement of the boards, and a controlling means operable by a board during its feeding movement for initiating operation of said mechanism.

6. In a machine of the class described, the combination of means for feeding boards, a marking device including marking elements movable in the direction of movement of the boards, said marking device being movable to a position below the plane of movement of the boards, a mechanism for moving the marking device, and a controlling device operable by a board in its feeding movement for controlling the operation of said mechanism.

7. In a machine of the class described, the combination of means for feeding boards, a marking device spacially movable relative to boards so fed and including marking elements movable in the direction of movement of the boards, mechanism for actuating the marking device in its spacial movement, and means operable by boards during the feeding operation for controlling the operation of said mechanism.

8. In a machine of the class described, a marking device, a housing inclosing the same, said housing having a movable portion, and automatic means for actuating said movable portion to afford access to the marking device.

9. In a machine of the class described, the combination of a marking device, a housing inclosing the same, said housing having a movable portion, feeding means for feeding material to said marking device, and means operable from said feeding means for actuating the movable portion of the housing to afford access to the marking device.

10. In a machine of the class described, the combination of feeding mechanism for feeding boards, pressure mechanism for applying pressure to boards during the feeding operation, a marking device for marking boards during the feeding operation, and means for actuating said parts in synchronism.

11. In a machine of the class described, the combination of mechanism for feeding boards, a marking device for marking during the feeding operation, and yieldable holding members movable with a board to and from the marking device and adapted to engage boards during the feeding operation to hold them to the marking device.

12. In a machine of the class described, the combination of means for feeding boards, a marking device adapted to coöperate with the ends of boards so fed, and a pressure wheel adapted to coöperate with boards in the feeding operation and movable toward the marking device.

13. In a machine of the class described, a branding device comprising a wheel, resistance elements annularly disposed thereon, marking elements peripherally disposed on the wheel in operative association with the resistance elements, means for supplying electric current to the resistance elements, and a housing encompassing the wheel, said housing being provided with a removable closure adapted when removed to permit access to the marking elements.

14. In a machine of the class described, the combination with means for feeding boards horizontally, of a rotatably mounted branding device adapted to engage the ends of the boards as they are moved, and means for holding the boards in engagement with said branding device, said means comprising a spring-pressed plate over which the ends of the boards pass during their movement, and a blade projecting upwardly from said plate, which blade is adapted to engage the boards as they pass thereover.

15. In a machine of the class described, the combination with means for feeding boards horizontally, of a rotatably mounted branding device adapted to engage the ends of the boards as they are moved, and means for holding the boards in engagement with said branding device, said means comprising a spring-pressed plate arranged adjacent the branding device, and a plurality of blades projecting upwardly from said plate, said blades being inclined so as to force the boards toward the branding device as they are moved past the same.

16. In a machine of the class described, the combination with means for feeding boards horizontally, of a rotatably mounted branding device adapted to engage the ends of the boards as they are moved, means for holding the boards in engagement with said branding device, said means comprising a spring-pressed plate over which the ends of the boards pass during their movement and a blade projecting upwardly from said plate, which blade is adapted to engage the boards as they pass thereover, and a pressure wheel adapted to engage the top faces of the boards as they are fed past the marking wheel and the spring-pressed plate.

17. In a machine of the class described, the combination with means for feeding boards horizontally, of a rotatably mounted branding device adapted to engage the ends of the boards as they are moved, means for holding the boards in engagement with said branding device, said means comprising a spring-pressed plate arranged adjacent the branding device and a plurality of blades projecting upwardly from said plate, said blades being inclined so as to force the boards toward the branding device as they are moved past the same, and a pressure wheel adapted to engage the top faces of the boards as they are fed past the marking wheel and the spring-pressed plate.

In testimony whereof I hereunto affix my signature in the presence of two witnesses, this 14th day of December, 1915.

THOMAS A. COLEMAN.

Witnesses:
W. D. MYERS,
J. M. FRYE.

In testimony whereof I hereunto affix my signature in the presence of two witnesses, this 26th day of November, 1915.

PETER VREDENBURGH, Jr.

Witnesses:
J. L. THOMAS,
E. F. ARNOLD.